Nov. 7, 1967   J. B. MURPHY   3,350,991
PHOTOGRAPHIC APPARATUS
Filed April 21, 1965

INVENTOR
John B. Murphy
BY Brown and Mikulka
and
Robert E. Corb
ATTORNEYS

United States Patent Office 3,350,991
Patented Nov. 7, 1967

3,350,991
PHOTOGRAPHIC APPARATUS
John B. Murphy, West Roxbury, Mass., assignor to Polaroid Corporation, Cambridge, Mass., a corporation of Delaware
Filed Apr. 21, 1965, Ser. No. 449,797
6 Claims. (Cl. 95—13)

ABSTRACT OF THE DISCLOSURE

This invention relates to a unitary resilient closure member for use with photographic apparatus including a wall formed with an elongated opening through which film assemblies are advanced. The opening is defined by elongated lateral surfaces one of which is inclined outwardly and away from the path of movement of the film assembly toward the opening. The closure member has a generally obtuse V-shaped cross section one leg of which substantially closes the opening while the other leg extends into the opening and is resiliently biased against the inclined surface thereby defining a structural arrangement which prevents rays of light from directly traveling in said path of movement of the film assembly. The resilient member is deformed in response to engagement of the leading edge of the film assembly with the second leg of the closure member thereby allowing the closure member to be displaced sufficiently to permit withdrawal of the film assembly through the opening.

---

This invention further relates to photographic apparatus such as a camera for processing photographic film units and, more particularly, to apparatus for incorporation in a camera of the type from which film units are withdrawn to effect processing thereof.

The present invention is concerned with the construction of apparatus suitable for incorporation in so-called self-developing cameras generally of the type sold by Polaroid Corporation, designated "Model 100," and "Model 101," and shown and described together with film assemblages useful therein, for example, in U.S. Patents Nos. 3,161,122, 3,161,516, 3,176,039 and 3,165,040. Cameras of this type generally include a body or housing for holding a film pack containing a plurality of film units adapted to be successively exposed and then processed during withdrawal from the camera through a withdrawal opening therein. Processing is accomplished by drawing each film unit, including a pair of superposed sheets, between a pair of juxtaposed pressure-applying members, usually rolls, located within the camera adjacent the withdrawal opening in order to distribute a processing liquid between the superposed sheets.

Each film unit includes a leader adapted to be engaged manually outside of the camera for withdrawing the film unit between the pressure-applying members from the camera and a tab releasably attached to the leader at a point thereon spaced from the leading edge of the leader for advancing the leader from the film pack between the pressure-applying members from the camera, so that the leader protrudes to the extent that it can be manually engaged. The camera comprises a housing having two openings including the withdrawal opening through which the film units are withdrawn and an exit slot located to one side of the pressure-applying rolls through which the tab of each film unit projects and is withdrawn to advance the leader of the film unit between the pressure-applying members. Each tab is pulled from the camera through the exit slot to one side of both pressure-applying members to advance the leader, which is guided by means in the camera, between the pressure-applying members through the withdrawal opening to a position at which the leader protrudes sufficiently to be manually grasped, whereupon the tab separates from the leader. The aforementioned Patent No. 3,165,040 discloses a closure device for covering the withdrawal opening to prevent admission of actinic light and harmful foreign matter such as dust and dirt into the processing and exposure areas of the camera through the withdrawal opening. The closure device is movable from a closed position in which it provides a barrier to light and foreign matter to an open position in which it provides for substantially unobstructed withdrawal of a film unit in response to movement of a leader of the film unit between the pressure-applying members into engagement with the closure device. Following withdrawal of the film unit the closure device automatically returns to its closed position.

Objects of the invention are: to provide in a self-developing camera a novel light and dust obstructing closure device generally of the type described characterized by an improved, compact, simple and inexpensive construction; and to provide a closure device as described in the form of a unitary element fabricated of resilient sheet material.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing wherein.

Figure 3:
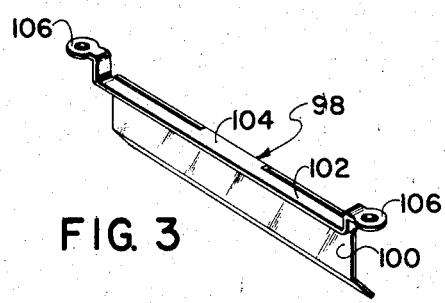
FIG. 3 is a perspective view of the closure device of the invention.
Figure 1:
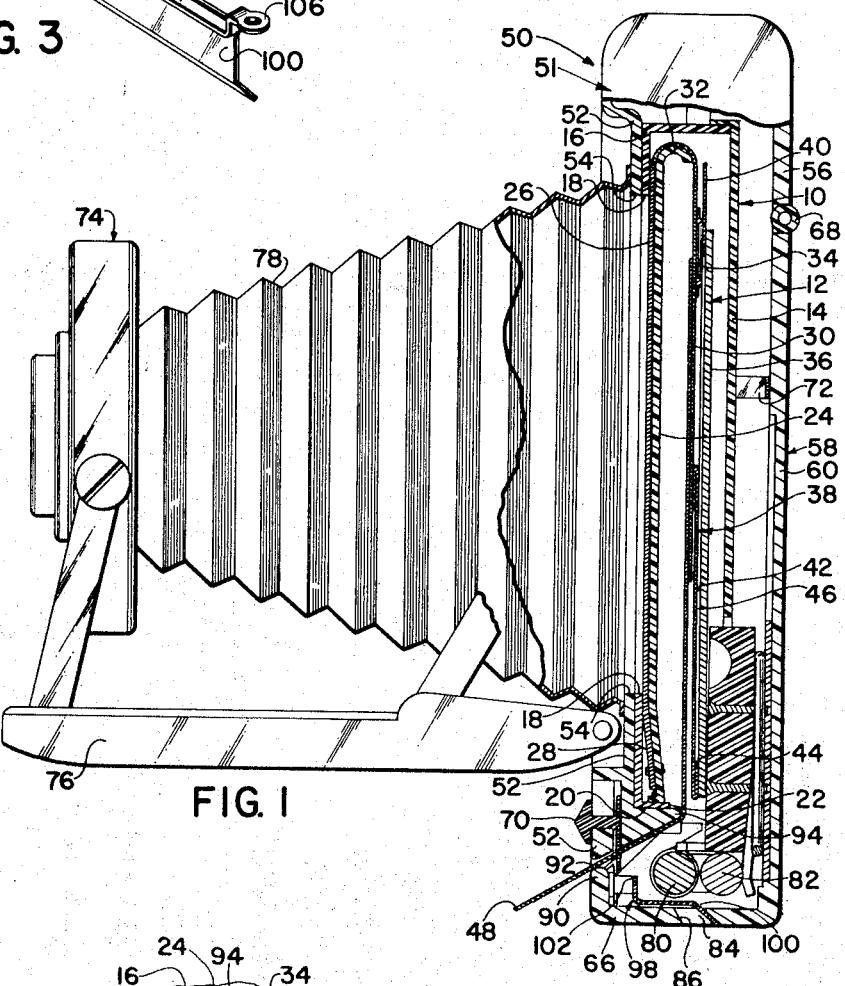
FIGURE 1 is an elevational view, partially in section, showing photographic apparatus in the form of a camera embodying the invention, the section being taken substantially midway between the sides of the camera.
Figure 2:
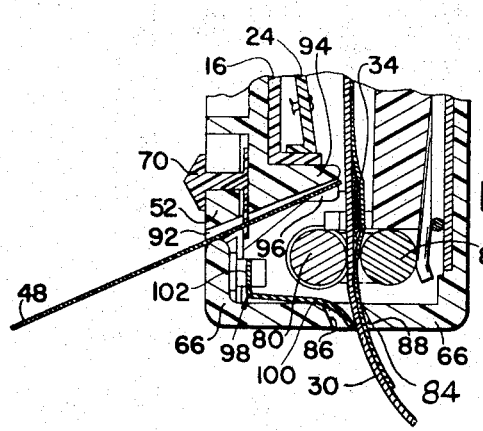
FIG. 2 is a fragmentary sectional view of a portion of the camera of FIGURE 1 illustrating the operation of the camera.

Photographic apparatus in the form of a camera embodying the invention is shown in FIGS. 1 and 2 together with a film pack of the type adapted to be employed therein. The film pack, generally designated 10, is shown for purposes of description as containing a single film unit 12 with the thicknesses of some of the sheet materials exaggerated for purposes of clarity of illustration. Film pack 10 comprises a generally parallelepiped shaped container or box including a rear wall 14, a forward wall 16 having a rectangular exposure aperture 18 formed therein, and end wall 20 [shown in the drawings at the lower end of the film pack] formed with a withdrawal aperture 22; and a pressure plate 24 disposed between the forward and rear walls across exposure aperture 18 for supporting photosensitive sheet materials against the forward wall across the exposure aperture in position for exposure.

Film unit 12 comprises a photosensitive sheet 26 disposed between forward wall 16 and pressure plate 24 and including a trailing edge section 28 attached to the end of pressure plate 24 nearest end wall 20. Photosensitive sheet 26 is coupled at its leading edge to a leader sheet 30 which extends around a curved end section 32 of pressure plate 24 behind the pressure plate between the latter and rear wall 14 toward withdrawal aperture 22. A rupturable container 34 of processing liquid is mounted on leader sheet 30 in the vicinity of the leading edge of the photosensitive sheet in position to dispense its liquid contents for distribution in contact with the photosensitive sheet when subjected to compressive pressure. The film unit includes a second or image-receiving sheet 36 substantially coextensive with the photosensitive sheet, mounted on a second leader sheet 38. Second leader sheet 38 is substantially longer than the image-receiving sheet and includes a trailing end section 40 extending beyond the trailing edge of the image-receiving sheet, an intermediate section 42 including a rectangular opening 44 secured to the margins of the image-receiving sheet around the margins of opening 44, and a leading end section 46 secured to leader sheet 30 near the leading end thereof. The leader sheets and photosensitive and image-receiving sheets are so constructed and coupled with one another as to position the photosensitive sheet in superposed registered relation with the image-receiving sheet with the intermediate section of the second leader sheet located between the photosensitive and image-receiving sheets, when leader sheet 30 is drawn toward and through withdrawal aperture 22 of the film pack container. Although only one film unit 12 is shown within the film pack, the film pack will normally contain a plurality of film units, e.g., eight, all similarly constructed and arranged with the photosensitive sheets 26 disposed in stacked relation between the pressure plate and the forward wall of the film pack container.

As a means for withdrawing each film unit from the pack and from the camera, there is provided a narrow leader or tab 48 releasably attached at one end to leader sheet 30 between the leading end thereof and the trailing edge of the photosensitive sheet and extending through withdrawal aperture 22 of the film pack. The camera is of the type including a passage through which leader 48 extends so that it may be grasped and pulled to one side of a pair of pressure-applying members within the camera for advancing the leading end portion of leader 30 and leading end section 46 of second leader sheet 38 between the pressure-applying members and from the camera through a withdrawal opening therein sufficiently to permit the leading end portion of leader sheet 30 to be engaged (manually) for withdrawing the film unit from the camera between the pressure-applying members. The initial withdrawal movement of leader 48 of a film unit causes trailing edge section 28 of photosensitive sheet 26 to become detached from pressure plate 24 and move around curved end section 32 behind the pressure plate into superposition with image-receiving sheet 36. During this movement of the photosensitive sheet of a film unit, the photosensitive sheets of any other film units within the pack remain stationary by virtue of their attachment to the pressure plate, and the image-receiving sheet of the film unit (being withdrawn) is retained against substantial movement by means within the camera which will be described more fully hereinafter. The leading end portion of leader sheet 30 and leading end section 46 of second leader sheet 38 are both tapered toward their leading ends to promote rolling of leading end section 46 upon itself during withdrawal, and leader 48 is substantially narrower than the other sheets of the film unit and is attached (e.g., by an adhesive) to leader sheet 30 substantially midway between the sides thereof in such a manner as to provide a strong, secure connection when leaders 30 and 48 are advanced in the same direction, adn a weak connection which becomes readily detached when leaders 30 and 48 are advanced along divergent paths.

The invention is incorporated in a camera, generally designated 50, having a body or housing including a forward section 51 comprising a forward wall 52 with a recessed section formed with an exposure aperture 54, side walls and, at one end, an end wall and a relatively short rear wall 56. The camera body, particularly the forward and rear walls are suitably formed so as to locate film pack 10 in proper position for exposure with exposure aperture 18 in the forward wall of the film pack aligned with exposure aperture 54 in forward wall 52 of the camera body. To completely enclose the film pack and the operative components of the camera while providing for loading of a film pack into the camera, the camera housing includes a rear section 58 comprising a rear wall 60, side walls and an end wall 66, pivotally mounted on the forward section of the camera body by a hinge 68 secured to rear walls 56 and 60. A latch mechanism 70 is mounted on forward housing section 51 for releasably retaining the two camera housing sections in the closed or operative position shown in FIGURE 1 and permits the rear section to be pivoted to an open position to permit loading of a film pack into the camera housing. A spring 72 is provided on the inside of rear wall 60 for engaging the film pack and retaining it against forward wall 52 of the camera body.

The camera, as shown in FIGURE 1, includes the conventional components of a camera including a lens and shutter assembly 74, a door 76 on which is mounted an erecting system, the door in turn being pivotally mounted on the forward section of the camera body, and a bellows 78 connecting the lens and shutter assembly with forward wall 52 of the camera body. In the preferred form, the bellows and erecting system are capable of being folded to locate the lens and shutter assembly within the recess defined by forward wall 52 with door 76 covering the recess to provide a compact camera construction.

Processing of the exposed photosensitive sheet 26 of a film unit is accomplished by advancing the photosensitive and second sheets of the film unit in superposition between a pair of juxtaposed pressure-applying members for compressing container 34 to dispense its liquid contents for distribution between the superposed photosensitive and image-receiving sheets. The juxtaposed pressure-applying members preferably take the form of cylindrical rolls 80 and 82 mounted on the rear housing section in juxtaposition with their axes substantially in a plane perpendicular to the plane of movement of the sheets within the camera housing adjacent end wall 66. The end wall is provided with a narrow withdrawal opening or passage 84 aligned with the bite of the rolls through which a film unit may be advanced from the camera housing between rolls 80 and 82. Passage 84 is defined by elongated forward and rear lateral surfaces designated, respectively, 86 and 88, inclined outwardly and rearwardly for reasons which will appear more fully hereinafter.

Read body section 58 includes a relatively short forward wall 90 which cooperates with forward wall 52 to define a withdrawal or exit slot 92 for leaders 48. The film pack is initially provided with a cover sheet (not shown) for closing exposure aperture 18 and this cover sheet includes a leader coupled with leader 48 (of the first film unit) which is preferably folded upon itself so as not to extend from the film pack to the same extent as the leader of the cover sheet and is, in turn, secured to the folded leader 48 of the next succeeding film unit. By virtue of this arrangement, when the film pack is loaded into the camera in the position shown in FIGURE 1 and the rear body section is pivoted into closed position, preferably only the first leader, that is, the leader attached to the cover sheet, extends from the camera through withdrawal opening 92 so that the first leader may be grasped for withdrawing the cover sheet through opening 92 and, at the same time, unfolding and withdrawing the leading end portion of leader 48 of the first film unit so that the latter may be grasped manually. To process a film unit, leader 48 is grasped and withdrawn from the camera through opening 92 to advance the leading end portion of leader 30 and the leading end section 46 of second leader 38 between rolls 80 and 82 through passage 84 substantially to the position shown in FIG. 2, at which point leader 48 separates from the film unit.

Means are provided for guiding leader 30 and leading end section 46 between the pressure-applying rolls and effecting separation of leader 48. In the form shown, these means include a stripper bar 94, which may be formed as an integral part of the forward body section 51, extending from forward wall 52 rearwardly within the camera body adjacent end wall 20 of the film pack. Stripper bar 94 includes a rear surface located approximately in the plane of movement of film units from within the film pack between the pressure-applying rolls and is formed with a channel 96 having a width narrower than the widths of leader sheets 30 and 38, but slightly wider than leader 48, so that the latter will pass through the channel and exit slot 92, while the leader sheets are unable to enter the channel and are guided by the stripper bar between the pressure-applying rolls.

In accordance with the invention, the camera includes a closure for withdrawal opening 84 for preventing the admission of light and foreign materials such as dust through the opening into the processing and exposure regions of the camera housing while permitting advancement of a leader through the opening from the housing. This closure is in the form shown of a unitary device that is quite simple in construction and is designed to be opened automatically by engagement of the leading edge of leader sheet 30, sufficiently to allow a film unit to be withdrawn, without inhibition, through the opening while engaging the film unit in such a way as to admit little or no light through the opening during withdrawal movement of a film unit. The closure, designated 98, comprises a single element preferably formed of a resilient sheet material, such as metal or organic plastics, and includes an elongated closure section 100 having a generally obtuse V-shaped cross section and an elongated resilient support section 102 coupled intermediate its ends to the mid portion of the closure section by a connecting section 104. Support section 102 includes L-shaped brackets 106 at its ends at which the support section is secured to forward wall 90 adjacent the side walls by such means as screws. Closure 98 is mounted so that closure section 100 extends rearwardly adjacent the inner surface of end wall 66 toward opening 84 and into the opening with the edge portion of closure section 100 disposed substantially in face-to-face relation with rear lateral surface 88 defining the rear side of the opening.

It will be apparent (see FIGURE 1) that in this closed position the closure effectively prevents the admission of light directly (in the direction of film movement) into the camera housing while also closing the opening against dust and dirt. The rear edge portion of closure section 100 is inclined with respect to the plane of movement of leader 30 between the pressure-applying rolls and is located so that the leading edge of the leader will engage this inclined edge portion of the closure section to deflect the closure section forwardly against the bias of support section 102 which functions as a weak spring for retaining the closure section in closed position. During advancement of leader 30 through withdrawal opening 84, closure section 100 is displaced to the position shown, for example, in FIG. 2, at which it bears against the forward surface of the leader and, during withdrawl of the film unit, against the outer surface of the photosensitive sheet. The rear surface of leading end section 46 and the outer surface of the image-receiving sheet will bear against an edge of rear lateral surface 88 during withdrawal through the opening so that little or no light will be admitted through the opening.

In summary, it will be seen that the invention provides a unique closure device that is simply and easily formed as a unitary element of resilient sheet material and is capable of effectively closing the film withdrawal opening of a camera to prevent admission of light and foreign matter into the camera, automatically opens to permit the unobstructed passage of a film unit in response to engagement with a leader and then returns automatically to its closed position.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. In photographic apparatus including a wall formed with an elongated opening through which film assemblies are advanced from the apparatus, in combination:

a closure device for said opening movable into an open position in response to movement of the leading edge of a film assembly into engagement with said closure;

said opening being defined by elongated lateral surfaces at least one of which is inclined outwardly and away from the path of movement of said film assembly toward said opening;

said closure device including a closure member substantially equal in length to said opening and including a first portion extending adjacent said wall across said opening toward said one surface and a second section extending into said opening adjacent to and generally parallel with said one surface; and support means including a resilient member for mounting said closure member and biasing said second section into contact with said one surface, said resilient member being deformable in response to engagement of said leading edge of said film assembly with said second section of said closure member allowing said closure member to be displaced sufficiently to permit withdrawal of said film assembly through said opening.

2. A closure device as defined in claim 1 wherein said closure member has a generally V-shaped cross section.

3. A closure device as defined in claim 1 wherein said closure member and said support means comprise a single element formed of a resilient sheet material.

4. A closure device as defined in claim 3 wherein said single element includes an elongated spring section mounted at its ends laterally of the ends of said opening and a connecting section joining said closure member to said spring section intermediate the ends thereof.

5. Photographic apparatus as defined in claim 1 including means defining a second opening for passage of said film assembly, said second opening being in alignment with said elongated opening and cooperating therewith to define a path of movement of said film assembly through said openings, said second section and said inclined surface when in contact with each other defining a plane which is directed at an angle to said path of movement, whereby any leakage of light between said second section and said one surface is directed at an angle to said path of movement and away from said second opening.

6. Photographic apparatus as defined in claim 1 including means defining a second opening for passage of said film assembly, said second opening lying in a plane containing said film assembly prior to withdrawal of said film assembly from said photographic apparatus, whereby any leakage of light between said second section and said one surface is directed at an angle to said first-mentioned plane and away from said second opening.

References Cited

UNITED STATES PATENTS 2,628,545   2/1953   Kurnick _____ 95—19

JOHN M. HORAN, *Primary Examiner.*